United States Patent Office 2,965,505
Patented Dec. 20, 1960

2,965,505
SYNTHETIC REFRACTORY CHROME COMPOSITION

Harry M. Mikami, Norristown, Pa., assignor to E. J. Lavino and Company, Philadelphia, Pa., a corporation of Delaware No Drawing. Filed May 6, 1958, Ser. No. 733,258

25 Claims. (Cl. 106—59)

This invention relates to a novel refractory composition and to a process for its preparation; more particularly, the invention is concerned with a novel refractory composition which is particularly suitable for providing a synthetic plastic chrome ore and to a method for its preparation. This invention also contemplates a novel synthetic plastic chrome ore having as its principal constituent the novel refractory composition.

The so-called "plastic chrome ores" used as refractories consist of a chrome ore, which is crushed and ground to a suitable grain size, a bonding agent such as sodium silicate, a plasticizing agent such as clay, and sufficient water to provide the composition with the desired consistency. These constituents are thoroughly mixed to produce a plastic material which can be readily rammed, tamped, troweled, cast, poured, vibrated, or otherwise applied or molded on, into, or around an installation requiring protection from high temperatures. Examples of installations where such a plastic chrome ore is used are: working hearths of heating, forging, and annealing furnaces; inner linings of open hearth furnace doors; sub-hearths of open hearth furnaces; sulfite recovery furnaces employed in the kraft paper process; high temperature steam boilers of electric generating plants, and the like.

After application of the plastic chrome ore, an initial set is obtained by air drying which may be accelerated by gentle heating at relatively low temperatures. Where the bonding agent employed is sodium silicate, this initial bond is obtained by evaporation of water from the sodium silicate solution to provide a cementious sodium silicate residue. After the initial set is obtained, the furnace, heater, kiln, boiler, or the like, may be fired to ordinary operating temperatures according to the prescribed heating-up schedule for the equipment, or the equipment may be deliberately prefired, in order to "burn-in," i.e., ceramically bond the plastic chrome ore.

The characteristics of a plastic chrome ore under those relatively high temperatures encountered in equipment in which it is employed differs materially in certain respects from those of chrome-magnesia brick under similar conditions. Chrome-magnesia brick can bear a load on the order of 25 p.s.i. at temperatures as high as 3000° F. and even higher. However, chrome-magnesia brick is comparatively brittle and cannot withstand sudden impact of high intensity. It tends to shatter under a hard blow and crumble under severe abrasion from the passage of heavy rough objects over it. Also, severe thermal shock from temperature fluctuations tends to cause spalling and flaking.

On the other hand, a plastic chrome ore does not have as good load bearing properties at high temperatures as chrome-magnesia brick. A plastic chrome ore formed of high grade ore, in the fired state, will be indented or yield locally at the site of a heavy blow instead of cracking or shattering. Such indentations or grooves will tend to heal or fill in due to the plasticity of the body. Under heavy rubbing, gouging, or abrasion of the plastic chrome ore there will be little tendency for the chromite grains to rub loose because they are held in a very viscous matrix. Thermal shock from temperature fluctuations do not cause spalling of the plastic chrome ore because the ceramic bond is not brittle, but rather a yielding viscous liquid.

The above-mentioned characteristics of a plastic chrome ore are present only in those mixes formed of the highest grades of chrome ore, such as certain ores from the Selukwe district of Southern Rhodesia and from India. Reserves of these superior grade ores are relatively small making their future supply uncertain. Besides being high priced, they vary substantially in quality from one lot to the next. Thus, manufacturers of plastic chrome ore, even though they use an ore from a source which would indicate it to be a superior grade for the stated purpose, cannot guarantee the quality of their products.

The more abundant widely used Philippine, Cuban, Balkan, Turkish, and Transvaal chrome ores do not provide a plastic chrome ore having those desirable properties heretofore described. Although most of these inferior grades of chrome ore can be installed by ramming, tamping and the like, as readily as plastic chrome ores containing superior grade ores, and have good thermal shock resistance, they have extremely poor abrasion and gouging resistance at high temperatures. Bodies formed of such ores are soft and weak, and they flow, deform, and/or groove excessively. Also such a soft body may be gouged or shoved out of position by objects moving over or against it.

A primary object of this invention is to provide a synthetic chrome refractory material which is particularly suitable for use in place of the natural chrome constituent of a plastic chrome ore.

Another object of this invention is the provision of a novel, economically feasible method for making a synthetic chrome refractory material which is especially suitable for use in forming a plastic chrome ore having those desirable properties of a plastic chrome ore formed of a superior grade of ore.

A further object of this invention is to provide a synthetic plastic chrome ore which at high temperatures has excellent resistance to impact, thermal shock, abrasion and gouging.

Yet another object of this invention is to provide a relatively inexpensive synthetic plastic chrome ore from low grade chrome ore, which novel composition has those desirable properties exhibited by plastic chrome ore formed of more expensive, superior grade chrome ore.

A still further object of this invention is to provide a synthetic plastic chrome ore which does not vary in properties with the quality of the source ore.

These and other objects will become more clearly apparent from a further consideration of this specification and claims.

According to this invention there is provided a method for producing a refractory composition which comprises heating a mixture comprising a chrome ore having a silicate content below about 5 percent, by weight, expressed as $SiO_2$, and from about 1.5 to about 15 percent, by weight of the mixture, of silica to a temperature in the range between about 2600° and 3000° F. to form a refractory composition comprising a major portion of spinel grains, which are principally chromite, in a highly siliceous matrix.

This invention also provides for a novel method for producing a refractory composition which comprises heating a mixture comprising a chrome ore and from about 1 to about 20 percent, by weight of said mixture, expressed as $Cr_2O_3$, of a chromium-bearing material selected from the group consisting of chromic oxide, chromic acid, and mixtures thereof, to a temperature in the range between about 2600° and about 3000° F. to form a refractory composition comprising a major portion of spinel grains, which are principally chromite, in a highly siliceous matrix.

There is also provided by this invention a novel refractory composition for forming a high quality plastic chrome ore which comprises from about 65 to about 96 percent, by weight, of chromite spinel grains in from about 4 to about 35 percent of a siliceous matrix comprising a crystalline silica selected from the group consisting of tridymite, cristobalite and mixtures thereof, and a glass comprising at least about 60 percent of silica.

There is further provided according to this invention a synthetic plastic chrome ore comprising the aforementioned refractory composition, a binder, and a clay plasticizer, which composition has a quality at least equal to the quality of plastic chrome ores produced from superior grade ores.

Natural chrome ore consists for the most part of chromite grains and gangue minerals, which in most ores are magnesium silicates such as serpentines, talc, olivines, pyroxenes, amphiboles, and the like. These silicate minerals may also contain minor amounts of alumina, oxides of iron, lime and traces of other elements. The quantity of silicate gangue minerals present in a natural chrome ore is generally expressed in terms of silica ($SiO_2$) content. Quartz or free silica, however, are virtually absent from most chrome ores. The silica ($SiO_2$) in chrome ores, in the form of silicates, generally varies from as little as 3 to as high as 15 percent, which would indicate a silicate gangue content of from about 6 to about 35 percent.

The composition of the matrix of a plastic chrome ore governs its viscosity at elevated temperatures. The composition of the matrix results from reactions among the silicate gangue, sodium silicate binder, clay plasticizer, and chromite. Sodium silicate and clay being additives, their addition can be rigidly controlled. As indicated above, however, the proportions of silicate gangue and chromite in a natural chrome ore vary widely, depending upon the source of the ore, and from one batch to another in ore from a single source. The presence of magnesium oxide in a glass is known to decrease the viscosity of the glass. Since a large proportion of the magnesium oxide present in the gangue enters the glassy matrix of a plastic chrome ore on firing, the glass phase produced by a chrome ore of high gangue content is generally of too low a viscosity so that bodies formed of such ore are soft and weak, and flow, deform and groove excessively.

It was found that by addition of silica, or a chromium-bearing mineral, or mixtures of these materials to a natural chrome ore and firing of the resulting mixture to elevated temperatures, a chrome refractory composition is obtained which is particularly suitable for use as the principal constituent of a plastic chrome ore. A plastic chrome ore containing such synthetic refractory composition after firing consists essentially of two phases, namely: a predominant crystalline spinel phase, in the form of individual grains, dispersed or embedded in a matrix of a substantially non-crystalline silicate glass. At room temperature the glass matrix of a fired plastic chrome ore is rigid and brittle such that it may be shattered by impact. However, at temperatures on the order of 2200°–2700° F., i.e., usual operating temperatures to which the composition is subjected, the glass matrix is heated above the brittle stage to the yielding stage, at which it becomes a highly viscous fluid. Thus, at high temperatures, bodies formed of compositions according to this invention yield locally at the site of a blow by a heavy object rather than crack, fracture or shatter. Furthermore, cracks or fractures are not propagated through the body. Because the body is yielding or plastic, grooves formed therein resulting from impact by sharp protuberances will tend to be healed or filled in. There is little or no tendency for chromite grains to rub loose because they are firmly held in the highly viscous glass matrix. Thermal shock from temperature fluctuations does not cause spalling because of the plasticity of the matrix.

In that aspect of the invention in which silica is combined with a natural chrome ore and the mixture is heated to elevated temperatures, the silicate content of the natural chrome ore should not exceed about 5 percent, expressed as $SiO_2$, and preferably the silicate content is below about 2 percent, expressed as $SiO_2$. If the silicate content of the natural ore greatly exceeds about 5 percent expressed as $SiO_2$, the glassy matrix of the ultimate plastic chrome ore containing the synthetic chrome refractory composition will have too low a viscosity and bodies formed thereof will flow, deform and groove excessively.

Natural chrome ores which may be combined with silica according to this invention may be any of these heretofore mentioned, such as Philippine, Transvaal, etc., and advantageously may be the cheaper grade ores. In addition to not having a gangue content in excess of about 5 percent, expressed as $SiO_2$, such ores should have a relatively low lime content, generally less than about 1 percent, and preferably less than about 0.5 percent. The reason for this is that all of the lime present goes into the glass phase and has a strong effect on lowering the viscosity of the glass. Since many ores are available with a lime content less than about 0.5 percent, the low lime specification is easily met.

With those natural chrome ores containing an excess of about 5 percent $SiO_2$, separation of a portion or all of the gangue minerals from chromite spinel may be effected by well known means to provide the ore with the desired low gangue content. Removal or reduction in quantity of gangue minerals may be effected for example by wet shaking table concentration or other suitable means.

Preferred chrome ores suitable for use in admixture with silica according to this invention are those whose various constituents fall within the following ranges:

| | Percent by weight |
|---|---|
| Chromic oxide ($Cr_2O_3$) | 40–50 |
| Iron oxide (as FeO) | 18–30 |
| Alumina ($Al_2O_3$) | 12–17 |
| Silica ($SiO_2$) | less than 5 |
| Lime (CaO) | less than 0.5 |
| Magnesia (MgO) | 8–15 |

As indicated above a chrome ore having a silicate content of less than about 5 percent expressed as $SiO_2$ is admixed with silica and fired to elevated temperatures. The silica preferably is relatively pure, e.g. has a purity of 90 percent or better, and contains less than 1 percent of either lime or magnesium oxide. The silica may comprise ground silica flour, sand, and the like.

In order to insure thorough mixing and blending of the ore and silica, the particle size of the ore is preferably below about 100 mesh and the particle size of the silica is below about 200 mesh. However satisfactory results may be obtained with ore having a substantial portion, e.g. 50 percent or more, of −20 mesh but +100 mesh particles.

The amount of silica which may be employed is such that silica comprises from about 1.5 to about 15 percent, by weight of the silica-ore mixture. Generally greater quantities of silica, e.g. 4–12 percent, are preferred for use with an ore whose gangue content is in the neighborhood of about 3–5 percent. Preferably from about 2 to about 8 percent of silica is employed with an ore having a silicate content below about 2 percent, expressed as $SiO_2$.

Mixing of the ore and silica may be effected in any suitable mixing equipment. It is frequently desirable to briquet, nodulize or otherwise agglomerate the mixture to provide a coarse lump material. In such case a small amount of water and temporary organic binder may be added to the mixture and mixing can be effected in any apparatus suitable for nodulizing the mixture. Typical equipment for such purpose includes balling devices such as cylinders, pans, cones and the like and also presses and extruding machines and the like.

After thorough mixing of the ore and silica, the mixture, preferably in the form of nodules, is heated to elevated temperatures of the order of about 2600° to about 3000° F., and preferably of the order of about 2800° to about 3000° F., for a period of several hours. During such firing of the mixture it is transformed into a refractory composition comprising a major portion of spinel grains, which are principally chromite, in a highly siliceous matrix. In other words, the chromite grains comprise the disperse phase in a substantially continuous disperse medium which is highly siliceous. Upon cooling, a portion of the siliceous matrix, which at high temperatures is a very viscous fluid, crystallizes to form a crystalline silica selected from the group consisting of tridymite, cristobalite and mixtures thereof. The remainder of the siliceous matrix is in the nature of a glass comprising at least about 60 percent of silica. The proportion of crystalline silica to glass will depend upon a number of factors, and particularly upon the quantity and nature of gangue minerals present in the ore. The relative proportion of crystalline silica to glass is not critical; however, the glass should have a silica content of at least about 60 percent. This novel refractory composition generally may comprise from about 65 to about 96 percent chromite grains in from about 4 to about 35 percent of the above described siliceous matrix. Preferably this refractory composition comprises about 85 to about 95 percent chromite spinel and from about 5 to 15 percent siliceous matrix.

As indicated previously, magnesium oxide is present in substantial amounts in both the chromite and gangue portions of a natural chrome ore. The magnesium oxide present in the chromite portion is not objectionable; however the ratio of magnesium oxide to silica in the glass phase should be low, otherwise the viscosity of the glass at elevated temperatures of the order of 2400° to 2700° F. will be too low. In the procedure above-described this ratio is reduced by silica addition after removal of a portion or all of the magnesium silicate gangue if necessary. It was also found that certain chromium-bearing materials hereinafter specified are effective to withdraw the magnesium oxide from the ganuge and tie it up in a chromite spinel phase. In this maner the ratio of magnesium oxide to silica in the glass phase is reduced to within tolerable limits.

According to another embodiment of this invention, therefore, the refractory chrome composition described above can be obtained by addition of a chromium-bearing material to a natural chrome ore.

The lime content of the chrome ore should not exceed about 1 percent for reasons heretofore presented. However, the gangue content of the ore may exceed 5 percent and may be as high as 15 percent, although preferably it does not exceed about 8 percent, all of these expressed as $SiO_2$.

Prefered compositions of chrome ore for admixture with a chromium-bearing material comprise the following constituents in the below stated amounts:

| | Percent by weight |
|---|---|
| Chromic oxide ($Cr_2O_3$) | 40–50 |
| Iron oxide (as FeO) | 18–30 |
| Alumina ($Al_2O_3$) | 12–17 |
| Silica ($SiO_2$) | 2–8 |
| Lime (CaO) | Less than 1 |
| Magnesia (MgO) | 8–15 |

Chromium-bearing materials which may be employed in the present invention include those selected from the group consisting of chromic oxide, chromic acid, and mixtures thereof. The amount of chromium-bearing material used should comprise from about 1 to about 20 percent, by weight of the mixture, expressed as $Cr_2O_3$. Preferably the chrome ore has a particle size below about 100 mesh and the chromium-bearing mineral has a particle size below about 200 mesh.

The chrome ore and chromium-bearing material are mixed together, preferably nodulized, and then fired in the manner previously described with respect to the chrome ore-silica composition.

According to a further embodiment of this invention, the above-described, novel refractory composition may be prepared by forming an admixture of a chrome ore with both silica and a chromium-bearing material. In this instance the chrome ore may have a silicate content higher than about 5 percent expressed as $SiO_2$, for example as high as about 15 percent or higher, expressed as $SiO_2$. The quantities of silica and chromium-bearing material used are substantially the same as those heretofore specified when either material is used alone. The respective amounts of silica and chromium-bearing material will depend upon such factors as the quantity and composition of the gangue minerals of the natural ore employed. The mixing and firing steps used are those previously described.

In the plastic chrome ore provided according to this invention, the previously described synthetic refractory composition comprises the principal ingredient. Generally this synthetic refractory composition will comprise from about 75 to about 90 percent, by weight, of the plastic chrome ore.

Prior to forming the plastic chrome ore, the synthetic refractory composition which forms its principal constituent, should be crushed and ground, preferably so that the composition has a particle size gradient. Crushing, grinding, and even blending with other constituents may be carried out as a single operation or in separate operations. All of the particles of the synthetic refractory composition should pass through a one-half inch screen and preferably 15 to 25 percent of the partciles are retained on an 8 mesh screen while from about 25 to about 45 percent of the particles have a particle size less than 200 mesh.

Since the novel synthetic refractory composition of this invention has little or no plasticity and essentially no dry bonding strength, bonding and plasticizing agents form a part of the plastic chrome ore. The materials commonly used to impart plasticity and dry strength are plastic clays and sodium silicate.

The clay used in the plastic chrome ore of this invention may comprise a kaolin type clay, a bentonite clay, and the like, preferably a kaolin type clay. For many purposes it is preferred that the clay constitute about 3 percent by weight of the mixture. If greater refractoriness is desired and a higher degree of plasticity is not needed, the percentage of clay can be reduced to about 1 percent. On the other hand, when greater plasticity and dry strength are required, the percentage of clay may be as much as 5 percent but with some reduction in refractoriness. Preferably, the clay is in a fine state of subdivision, e.g. such that the greater portion of it will pass through a 200 mesh screen.

Sodium silicate is included in a plastic chrome ore of this invention as a plasticizer and to confer dry strength. Preferably it is supplied as liquid sodium silicate containing about 53 percent of water and having a $Na_2O:SiO_2$ ratio of 1:2.4. For most purposes a sufficient quantity of liquid sodium silicate is added so that the plastic chrome ore comprises from about 2 to about 6 percent by weight of sodium silicate on a water-free basis. Other ratios of $Na_2O:SiO_2$ and other concentrations of liquid sodium silicate may be used. Likewise, solid sodium silicate may be used by having enough water in the mixture to dissolve it. The total amount of water present in the plastic chrome ore, in addition to being sufficient to dissolve the sodium silicate, should be such as to provide the mixture with the required workability or consistency.

The following examples are illustrative of this invention:

*Example I*

A natural chrome ore is subjected to wet shaking table concentration to reduce the amount of magnesium silicate gangue present to 0.80 percent, by weight, expressed as $SiO_2$. After concentration the ore has the following oxide analysis:

| | Percent by weight |
|---|---|
| Chromic oxide ($Cr_2O_3$) | 46.81 |
| Iron oxide (as FeO) | 25.22 |
| Alumina ($Al_2O_3$) | 16.73 |
| Silica ($SiO_2$) | 0.80 |
| Lime (CaO) | 0.05 |
| Magnesia (MgO) | 9.56 |

The concentrated ore is crushed and ground to a particle size such that in excess of 95 percent, by weight, passes through a 100 mesh screen and in excess of 65 percent passes through a 325 mesh screen.

A mixture comprising 92.50 percent of the above concentrated chrome ore and 7.5 percent of silica is formed in a wet pan mixer provided with mulling wheels. A small amount of an aqueous solution of lignin sulfite and water are added to aid in agglomeration. The silica comprises 96 percent or more $SiO_2$, about 0.2 percent CaO and about 0.1 percent MgO, and has a particle size such that in excess of 85 percent of the material passes through a 200 mesh screen.

After thorough mixing, the mixture is pressed into a number of 9 x 4½ x 3 in. bricks which are thereafter dried in a dryer at a temperature between about 150° and 230° F. Certain of the bricks are placed in a tunnel kiln and fired at a temperature of 2840° F. for a period of several hours. Other bricks of the same composition are fired at a temperature of 2920° F. for a similar period of time.

Thin sections of certain of the bricks are inspected after cooling to room temperature and are found to comprise a synthetic refractory material comprising a major portion of chromite grains dispersed in a siliceous matrix consisting of crystalline silica, mainly cristobalite, and a glass comprising in excess of 60 percent silica.

The cooled synthetic refractory composition is crushed in a jaw crusher and thereafter ground in a mulling pan. As a result of crushing and grinding, all of the refractory composition passes through a ½ in. screen, about 25 percent of the particles are retained on an 8 mesh screen, and about 40 percent of the particles have a particle size less than 200 mesh. Kaolin type clay, sodium silicate solution and water are added to the synthetic refractory composition in the mulling pan to form a plastic chrome ore comprising 86.7 parts by weight of the synthetic refractory composition, 2.6 parts clay, 3.3 parts sodium silicate (water-free basis), and 2.5 to about 3.5 parts water.

After thorough blending of the various constituents forming the plastic chrome ore, the material is formed into blocks and heated to about 2500° F. The blocks so formed yield locally at the site of a heavy blow, but do not crack or shatter. Under heavy rubbing, gouging or abrasion the chromite grains do not rub loose because they are held in a very viscous matrix. There is no evidence of spalling of the blocks due to thermal shock from sudden temperature fluctuations.

*Example II*

The procedure of Example I is repeated with the exception that a mixture comprising 96.25 percent, by weight, of the specified concentrated ore and 3.75 percent of the stated silica is employed in forming the synthetic refractory composition. A plastic chrome ore containing this synthetic refractory composition and formed according to Example I has the same advantageous properties at elevated temperatures as the plastic chrome ore of Example I.

*Example III*

The procedure of Example I is repeated with the exception that a mixture comprising 85.0 percent, by weight, of the specified concentrated ore and 15.0 percent of the stated silica is employed in forming the synthetic refractory composition. A plastic chrome ore containing this synthetic refractory composition and formed according to Example I has the same advantageous properties at elevated temperatures of the plastic chrome of Example I, although to a somewhat lesser degree than the latter.

*Example IV*

A natural chrome ore having a magnesium silicate gangue content of 3.55 percent, by weight, expressed as $SiO_2$ and the following oxide analysis is crushed and ground to a particle size such that in excess of 95 percent, by weight, passes through a 100 mesh screen and in excess of 65 percent passes through a 325 mesh screen:

| | Percent by weight |
|---|---|
| Chromic oxide ($Cr_2O_3$) | 44.51 |
| Iron oxide (as FeO) | 24.63 |
| Alumina ($Al_2O_3$) | 15.90 |
| Silica ($SiO_2$) | 3.55 |
| Lime (CaO) | 0.30 |
| Magnesia (MgO) | 10.07 |

A mixture comprising 95.0 percent of the above chrome ore and 5 percent of silica is formed in a wet pan mixer provided with a mulling wheel. A small amount of an aqueous solution of lignin sulfite and water are added to aid in agglomeration. The silica comprises 96 percent or more $SiO_2$, about 0.2 percent CaO and about 0.1 percent MgO, and has a particle size such that in excess of 85 percent of the material passes through a 200 mesh screen.

After thorough mixing, the mixture is pressed into a number of 9 x 4½ x 3 in. bricks which are thereafter dried in a dryer at a temperature between about 150° and 230° F. The bricks are thereafter placed in a tunnel kiln and fired at a temperature of 2920° F. for a period of several hours.

Thin sections of certain of the bricks are inspected after cooling to room temperature and are found to comprise a synthetic refractory material comprising a major portion of chromite grains dispersed in a siliceous matrix consisting of crystalline silica, mainly cristobalite, and a glass comprising in excess of 60 percent silica.

The cooled synthetic refractory composition is crushed in a jaw crusher and thereafter ground in a mulling pan. As a result of crushing and grinding, all of the refractory composition passes through a ½ in. screen, about 25 percent of the particles are retained on an 8 mesh screen, and about 40 percent of the particles have a particle size less than 200 mesh. Kaolin type clay, sodium silicate solution and water are added to the synthetic refractory composition in the mulling pan to form a plastic chrome ore comprising 86.7 parts by weight of the synthetic refractory composition, 2.6 parts clay, 3.3 parts sodium silicate (water-free basis), and 2.5 to about 3.5 parts water.

After thorough blending of the various constituents forming the plastic chrome ore, the material is formed into blocks and heated to about 2500° F. The blocks so formed yield locally at the site of a heavy blow, but do not crack or shatter. Under heavy rubbing, gouging or abrasion the chromite grains do not rub loose because they are held in a very viscous matrix. There is no evidence of spalling of the blocks due to thermal shock from sudden temperature fluctuations.

Example V

The procedure of Example IV is repeated with the exception that a mixture comprising 90.0 percent, by weight, of the specified natural ore and 10.0 percent of the stated silica is employed in forming the synthetic refractory composition. A plastic chrome ore containing this synthetic refractory composition and formed according to Example IV has the same advantageous properties at elevated temperatures as the plastic chrome ore of Example IV, although to a somewhat lesser degree than the latter.

Example VI

A natural chrome ore having a magnesium silicate gangue content of 3.55 percent, by weight, expressed as $SiO_2$ and the following oxide analysis is crushed and ground to a particle size such that in excess of 95 percent, by weight, passes through a 100 mesh screen and in excess of 65 percent passes through a 325 mesh screen:

| | Percent by weight |
|---|---|
| Chromic oxide ($Cr_2O_3$) | 44.51 |
| Iron oxide (as FeO) | 24.63 |
| Alumina ($Al_2O_3$) | 15.90 |
| Silica ($SiO_2$) | 3.55 |
| Lime (CaO) | 0.30 |
| Magnesia (MgO) | 10.07 |

A mixture comprising 95.0 percent of the above chrome ore and 5 percent of chromic oxide is formed in a wet pan mixer provided with a mulling wheel. A small amount of an aqueous solution of lignin sulfite and water are added to aid in agglomeration. The chromic oxide has a particle size such that in excess of 98 percent passes through a 325 mesh screen.

After thorough mixing, the mixture is pressed into a number of 9 x 4½ x 3 in. bricks which are thereafter dried in a dryer at a temperature between about 150° and 230° F. The bricks are thereafter placed in a tunnel kiln and fired at a temperature of 2920° F. for a period of several hours.

Thin sections of certain of the bricks are inspected after cooling to room temperature and are found to comprise a synthetic refractory material comprising a major portion of chromite grains dispersed in a siliceous matrix consisting of crystalline silica, mainly cristobalite, and a glass comprising in excess of 60 percent silica.

The cooled synthetic refractory composition is crushed in a jaw crusher and thereafter ground in a mulling pan. As a result of crushing and grinding, all of the refractory composition passes through a ½ in. screen, about 25 percent of the particles are retained on an 8 mesh screen, and about 40 percent of the particles have a particle size less than 200 mesh. Kaolin type clay, sodium silicate solution and water are added to the synthetic refractory composition in the mulling pan to form a plastic chrome ore comprising 86.7 parts by weight of the synthetic refractory composition, 2.6 parts clay, 3.3 parts sodium silicate (water-free basis), and 2.5 to about 3.5 parts water.

After thorough blending of the various constituents forming the plastic chrome ore, the material is formed into blocks and heated to about 2500° F. The blocks so formed yield locally at the site of a heavy blow, but do not crack or shatter. Under heavy rubbing, gouging or abrasion the chromite grains do not rub loose because they are held in a very viscous matrix. There is no evidence of spalling of the blocks due to thermal shock from sudden temperature fluctuations.

Example VII

The procedure of Example VI is repeated with the exception that a mixture comprising 90.0 percent, by weight, of the specified natural ore, 5.0 percent by weight of the stated chromic oxide and 5 percent of silica comprising 96 percent or more $SiO_2$, about 0.2 percent CaO, and about 0.1 percent MgO and having a particle size such that in excess of 85 percent of the material passes through a 200 mesh screen is employed in forming the synthetic refractory composition. A plastic chrome ore containing this refractory composition and formed according to Example VI has the same advantageous properties at elevated temperatures as the plastic chrome ore of Example VI.

Example VIII

A mixture comprising 89.72 percent, by weight, of the concentrated chrome ore of Example I, 7.28 percent of silica, and 3.0 percent of chromic oxide is formed in a wet pan mixer provided with a mulling wheel. A small amount of an aqueous solution of lignin sulfite and water are added to aid in agglomeration. The silica comprises in excess of 96 percent $SiO_2$, about 0.2 percent CaO and about 0.1 percent MgO, and has a particle size such that in excess of 85 percent of the material passes through a 200 mesh screen. The chromic oxide has a particle size such that in excess of 98 percent thereof passes through a 325 mesh screen.

After thorough mixing, the mixture is pressed into a number of 9 x 4½ x 3 in. bricks which are thereafter dried in a dryer at a temperature between about 150° and 230° F. The bricks are thereafter placed in a tunnel kiln and fired at a temperature of 2840° F. for a period of several hours.

Thin sections of certain of the bricks are inspected after cooling to room temperature and are found to comprise a synthetic refractory material comprising a major portion of chromite grains dispersed in a siliceous matrix consisting of crystalline silica, mainly cristobalite, and a glass comprising in excess of 60 percent silica.

The cooled synthetic refractory composition is crushed in a jaw crusher and thereafter ground in a mulling pan. As a result of crushing and grinding, all of the refractory composition passes through a ½ in. screen, about 25 percent of the particles are retained on an 8 mesh screen, and about 40 percent of the particles have a particle size less than 200 mesh. Kaolin type clay, sodium silicate solution and water are added to the synthetic refractory composition in the mulling pan to form a plastic chrome ore comprising 86.7 parts by weight of the synthetic refractory composition, 2.6 parts clay, 3.3 parts sodium silicate (water-free basis), and 2.5 to about 3.5 parts water.

After thorough blending of the various constituents forming the plastic chrome ore, the material is formed into blocks and heated to about 2500° F. The blocks so formed yield locally at the site of a heavy blow, but do not crack or shatter. Under heavy rubbing, gouging or abrasion the chromite grains do not rub loose because they are held in a very viscous matrix. There is no evidence of spalling of the blocks due to thermal shock from sudden temperature fluctuations.

Example IX

The procedure of Example VIII is repeated with the exception that a mixture comprising 93.36 percent, by weight, of the specified ore concentrate, 3.64 percent of the stated silica and 3.0 percent of the chromic oxide is employed in forming the synthetic refractory composition. A plastic chrome ore containing this synthetic refractory composition and formed according to Example VIII has the same advantageous properties at elevated temperatures as the plastic chrome ore of Example VIII.

Example X

A Transvaal chrome ore in which a substantial portion of the silicate gangue is in the form of nodules is screened to remove the nodules and provide a beneficiated ore containing about 1.5 percent gangue, expressed as $SiO_2$. The beneficiated ore is crushed and ground to a particle size such that in excess of 95 percent, by weight, passes through a 100 mesh screen and in excess of 85 percent passes through a 200 mesh screen. The beneficiated ore has the following oxide analysis:

|  | Percent by weight |
|---|---|
| Chromic oxide ($Cr_2O_3$) | 45.73 |
| Iron oxide (as FeO) | 24.86 |
| Alumina ($Al_2O_3$) | 16.46 |
| Silica ($SiO_2$) | 1.51 |
| Lime (CaO) | 0.20 |
| Magnesia (MgO) | 10.46 |

A mixture comprising 95.0 percent of the above beneficiated chrome ore and 5.0 percent of silica is formed in a wet pan mixer provided with mulling wheels. A small amount of an aqueous solution of lignin sulfite and water are added to aid in agglomeration. The silica comprises in excess of 96 percent or more $SiO_2$, about 0.2 percent CaO and about 0.1 percent MgO, and has a particle size such that in excess of 85 percent of the material passes through a 200 mesh screen.

After thorough mixing, the mixture is pressed into a number of 9 x 4½ 3 in. bricks which are thereafter dried in a dryer at a temperature between about 150° and 230° F. The bricks are placed in a tunnel kiln and fired at a temperature of 2920° F. for a period of several hours.

Thin sections of certain of the bricks are inspected after cooling to room temperature and are found to comprise a synthetic refractory material comprising a major portion of chromite grains dispersed in a siliceous matrix consisting of crystalline silica, mainly cristobalite, and a glass comprising in excess of 60 percent silica.

The cooled synthetic refractory composition is crushed in a jaw crusher and thereafter ground in a mulling pan. As a result of crushing and grinding, all of the refractory composition passes through a ½ in. screen, about 25 percent of the particles are retained on an 8 mesh screen, and about 40 percent of the particles have a particle size less than 200 mesh. Kaolin type clay, sodium silicate solution and water are added to the synthetic refractory composition in the mulling pan to form a plastic chrome ore comprising 86.7 parts by weight of the synthetic refractory composition, 2.6 parts clay, 3.3 parts sodium silicate (water-free basis), and 2.5 to about 3.5 parts water.

After thorough blending of the various constituents forming the plastic chrome ore, the material is formed into blocks and heated to about 2500° F. The blocks so formed yield locally at the site of a heavy blow, but do not crack or shatter. Under heavy rubbing, gouging or abrasion the chromite grains do not rub loose because they are held in a very viscous matrix. There is no evidence of spalling of the blocks due to thermal shock from sudden temperature fluctuations.

*Example XI*

The procedure of Example X is repeated with the exception that a mixture comprising 90.0 percent, by weight, of the specified beneficiated ore and 10.0 percent of the stated silica is employed in forming the synthetic refractory composition. A plastic chrome ore containing this synthetic refractory composition and formed according to Example X has the same advantageous properties at elevated temperatures as the plastic chrome ore of Example X.

*Example XII*

A mixture comprising 92.0 percent, by weight, of the beneficiated chrome ore of Example X, 5.0 percent of silica, and 3.0 percent of chromic oxide is formed in a wet pan mixer provided with a mulling wheel. A small amount of an aqueous solution of lignin sulfite and water are added to aid in agglomeration. The silica comprises in excess of 96 percent $SiO_2$, about 0.2 percent CaO and about 0.1 percent MgO, and has a particle size such that in excess of 85 percent of the material passes through a 200 mesh screen. The chromic oxide has a particle size such that in excess of 98 percent thereof passes through a 325 mesh screen.

After thorough mixing, the mixture is pressed into a number of 9 x 4½ x 3 in. bricks which are thereafter dried in a dryer at a temperature between about 150° and 230° F. The bricks are thereafter placed in a tunnel kiln and fired at a temperature of 2840° F. for a period of several hours.

Thin sections of certain of the bricks are inspected after cooling to room temperature and are found to comprise a synthetic refractory material comprising a major portion of chromite grains dispersed in a siliceous matrix consisting of crystalline silica, mainly cristobalite, and a glass comprising in excess of 60 percent silica.

The cooled synthetic refractory composition is crushed in a jaw crusher and thereafter ground in a mulling pan. As a result of crushing and grinding, all of the refractory composition passes through a ½ in. screen, about 25 percent of the particles are retained on an 8 mesh screen, and about 40 percent of the particles have a particle size less than 200 mesh. Kaolin type clay, sodium silicate solution and water are added to the synthetic refractory composition in the mulling pan to form a plastic chrome ore comprising 86.7 parts by weight of the synthetic refractory composition, 2.6 parts clay, 3.3 parts sodium silicate (water-free basis), and 2.5 to about 3.5 parts water.

After thorough blending of the various constituents forming the plastic chrome ore, the material is formed into blocks and heated to about 2500° F. The blocks so formed yield locally at the site of a heavy blow, but do not crack or shatter. Under heavy rubbing, gouging or abrasion the chromite grains do not rub loose because they are held in a very viscous matrix. There is no evidence of spalling of the blocks due to thermal shock from sudden temperature fluctuations.

What is claimed is:

1. A method for producing a refractory composition which comprises heating a mixture consisting essentially of a chrome ore having a silicate content below about 5 percent, by weight, expressed as $SIO_2$, and from about 1.5 to about 15 percent, by weight, of silica to a temperature in the range between about 2600° and about 3000° F. to form a refractory composition comprising a major portion of spinel grains, which are principally chromite, in a highly siliceous matrix.

2. The method according to claim 1 in which said mixture is heated to a temperature in the range between about 2800° and about 3000° F.

3. The method according to claim 1 in which said mixture contains from about 4 to about 8 percent of silica.

4. The method according to claim 1 in which said chrome ore has a silicate content below about 2 percent, expressed as $SiO_2$.

5. A method for producing a refractory composition which comprises heating a mixture consisting essentially of a chrome ore having a silicate content below about 5 percent, by weight, expressed as $SiO_2$, and a particle size below about 100 mesh and from about 1.5 to about 15 percent, by weight, of silica having a particle size below about 200 mesh to a temperature in the range between about 2600° and about 3000° F. to form a refractory composition comprising a major portion of spinel grains, which are principally chromite, in a highly siliceous matrix.

6. The method according to claim 5 in which said mixture is heated to a temperature in the range between about 2800° and about 3000° F.

7. The method according to claim 5 in which said mixture contains from about 4 to about 8 percent of silica.

8. The method according to claim 5 in which said chrome ore has a silicate content below about 2 percent, expressed as $SiO_2$.

9. A method for producing a refractory composition which comprises heating a mixture consisting essentially of a chrome ore of the following oxide analysis:

| | Percent by weight |
|---|---|
| Chromic oxide ($Cr_2O_3$) | 40–50 |
| Iron oxide (as FeO) | 18–30 |
| Alumina ($Al_2O_3$) | 12–17 |
| Silica ($SiO_2$) | Less than 5 |
| Lime (CaO) | Less than 0.5 |
| Magnesia (MgO) | 8–15 | and from about 1.5 to about 15 percent, by weight, of silica to a temperature in the range between about 2600° and about 3000° F. to form a refractory composition comprising a major portion of spinel grains, which are principally chromite, in a highly siliceous matrix.

10. The method according to claim 9 in which said mixture is heated to a temperature in the range between about 2800° and about 3000° F.

11. The method according to claim 9 in which said mixture contains from about 4 to about 8 percent of silica.

12. The method according to claim 9 in which said chrome ore has a silicate content below about 2 percent, expressed as $SiO_2$.

13. The method according to claim 9 in which said chrome ore has a particle size below about 100 mesh and said silica has a particle size below about 200 mesh.

14. A method for producing a refractory composition which comprises heating a mixture consisting essentially of a chrome ore having the following oxide analysis:

| | Percent by weight |
|---|---|
| Chromic oxide ($Cr_2O_3$) | 40–50 |
| Iron oxide (as FeO) | 18–30 |
| Alumina ($Al_2O_3$) | 12–17 |
| Silica ($SiO_2$) | 2–8 |
| Lime (CaO) | Less than 1 |
| Magnesia (MgO) | 8–15 | and from about 1 to 20%, by weight, expressed as $Cr_2O_3$, of a chromium-bearing material selected from the group consisting of chromic oxide, chromic acid, and mixtures thereof, to a temperature in the range between about 2600° and about 3000° F. to form a refractory composition comprising a major portion of spinel grains, which are principally chromite, in a highly siliceous matrix.

15. The method according to claim 14 in which said mixture is heated to a temperature in the range between about 2800° and about 3000° F.

16. The method according to claim 14 in which said chromium-bearing material comprises chromic oxide.

17. The method according to claim 14 in which said chrome ore has a particle size below about 100 mesh and said chromium-bearing material has a particle size below about 200 mesh.

18. A method for producing a refractory composition which comprises heating a mixture consisting essentially of a chrome ore, from about 1.5 to about 15 percent, by weight, of silica, and from about 1 to about 20 percent, expressed as $Cr_2O_3$, of a chromium-bearing material selected from the group consisting of chromic oxide, chromic acid, and mixtures thereof to a temperature in the range between about 2600° and about 3000° F. to form a refractory composition comprising a major portion of spinel grains, which are principally chromite, in a highly siliceous matrix.

19. A refractory composition which consists essentially of from about 65 to about 96 percent, by weight of chromite spinel grains in from about 4 to about 35 percent of a siliceous matrix comprising a crystalline silica selected from the group consisting of tridymite, cristobalite and mixtures thereof, and a glass comprising at least about 60 percent of silica.

20. A refractory composition according to claim 19 comprising from about 85 to about 95 percent of chromite spinel grains and from about 5 to about 15 percent of siliceous matrix.

21. A refractory composition which consists essentially of from about 65 to about 96 percent, by weight, of chromite spinel grains having the following oxide analysis:

| | Percent |
|---|---|
| Chromic oxide ($Cr_2O_3$) | 43–55 |
| Iron oxide (as FeO) | 22–28 |
| Alumina ($Al_2O_3$) | 11–17 |
| Silica ($SiO_2$) | Less than 0.1 |
| Lime (CaO) | Less than 0.1 |
| Magnesia (MgO) | 8–12 | in from about 4 to about 35 percent of a siliceous matrix comprising a crystalline silica selected from the group consisting of tridymite, cristobalite and mixtures thereof; and a glass comprising at least about 60 percent of silica and which coexists in chemical equilibrium with a silica phase at temperatures to about 2600° F.

22. A synthetic plastic chrome ore consisting essentially of: (A) from about 75 to about 90 percent, by weight, of a divided solid refractory composition comprising from about 65 to about 96 percent of chromite spinel grains in from about 4 to about 35 percent of a siliceous matrix comprising a crystalline silica selected from the group consisting of tridymite, cristobalite and mixtures thereof; and a glass comprising at least about 60 percent of silica; (B) from about 2 to about 6 percent of an alkali metal silicate; (C) from about 1 to about 5 percent of a finely divided clay plasticizer, and (D) water in an amount providing workability.

23. The synthetic plastic chrome ore of claim 22 in which said alkali metal silicate comprises sodium silicate and said clay plasticizer comprises kaolin.

24. A synthetic plastic chrome ore consisting essentially of: (A) from about 75 to about 90 percent, by weight, of a divided solid refractory composition comprising from about 65 to about 96 percent of chromite spinel grains having the following oxide analysis:

| | Percent |
|---|---|
| Chromic oxide ($Cr_2O_3$) | 43–55 |
| Iron oxide (as FeO) | 22–28 |
| Alumina ($Al_2O_3$) | 11–17 |
| Silica ($SiO_2$) | Less than 0.1 |
| Lime (CaO) | Less than 0.1 |
| Magnesia (MgO) | 8–12 | in from about 4 to about 35 percent of a siliceous matrix comprising a crystalline silica selected from the group consisting of tridymite, cristobalite and mixtures thereof; and a glass comprising at least about 60 percent of silica and which coexists in chemical equilibrium with a silica phase at temperatures to about 2600° F.; (B) from about 2 to about 6 percent, of an alkali metal silicate, (C) from about 1 to about 5 percent of a finely divided clay plasticizer, and (D) water in an amount providing workability.

25. The synthetic plastic chrome ore of claim 24 in which said alkali metal silicate comprises sodium silicate and said clay plasticizer comprises kaolin.

References Cited in the file of this patent

UNITED STATES PATENTS

| 371,233 | Twynam | Oct. 11, 1887 |
| 2,792,311 | Davies | May 14, 1957 |

FOREIGN PATENTS

| 665,209 | Great Britain | Jan. 16, 1952 |
| 713,420 | Great Britain | Aug. 11, 1954 |